(12) United States Patent
Bai

(10) Patent No.: US 9,581,752 B2
(45) Date of Patent: Feb. 28, 2017

(54) DISPLAY DEVICE COMPRISING A LIGHT-GUIDE FILM HAVING A PLURALITY OF WAVEGUIDE PARTS THAT HAVE A REFRACTIVE INDEX

(71) Applicants: Boe Technology Group Co., Ltd., Beijing (CN); Beijing Boe Display Technology Co., Ltd., Beijing (CN)

(72) Inventor: Ling Bai, Beijing (CN)

(73) Assignees: Boe Technology Group Co., Ltd., Beijing (CN); Beijing Boe Display Technology Co., Ltd., Beijing (CN)

( * ) Notice: Subject to any disclaimer, the term of this patent is extended or adjusted under 35 U.S.C. 154(b) by 108 days.

(21) Appl. No.: 14/500,291

(22) Filed: Sep. 29, 2014

(65) Prior Publication Data

US 2015/0370013 A1 Dec. 24, 2015

(30) Foreign Application Priority Data

Jun. 18, 2014 (CN) .......................... 2014 1 0273166

(51) Int. Cl.
*F21V 8/00* (2006.01)
(52) U.S. Cl.
CPC .......... *G02B 6/005* (2013.01); *G02B 6/0068* (2013.01); *G02B 6/0078* (2013.01)
(58) Field of Classification Search
CPC . G02B 6/10; G02B 6/30; G02B 6/262; G02B 6/005
See application file for complete search history.

(56) References Cited

U.S. PATENT DOCUMENTS

| 6,295,105 | B1 | 9/2001 | Lee et al. | |
|---|---|---|---|---|
| 2012/0050459 | A1* | 3/2012 | Yoon | G02B 27/22 348/40 |
| 2012/0169791 | A1* | 7/2012 | Whitehead | G02F 1/133603 345/690 |

FOREIGN PATENT DOCUMENTS

| CN | 1621909 | 6/2005 |
|---|---|---|
| CN | 201184944 | 1/2009 |
| CN | 102483544 | 5/2012 |
| JP | 5417568 | 2/2014 |

OTHER PUBLICATIONS

Office action from Chinese Application No. 201410273166.0 dated Apr. 5, 2016.
Office action from Chinese Application No. 201410273166.0 dated Sep. 18, 2016.

* cited by examiner

*Primary Examiner* — Paul Lee
(74) *Attorney, Agent, or Firm* — Calfee, Halter & Griswold LLP

(57) ABSTRACT

A display device includes a display panel. A light-guide film is attached to a light-incident surface of the display panel. The light-guide film includes a light reflecting layer, a light exiting layer between the light reflecting layer and the display panel, and waveguide parts situated between the light reflecting layer and the light exiting layer. The light exiting layer has exit openings at positions facing each waveguide part, with each exit opening also facing a sub-pixel unit in the display panel. The display device also includes a light source. An end of each waveguide part is in communication with the light source. The light-guide film replaces a conventional backlight unit such that a thinner design for the display device is possible.

10 Claims, 4 Drawing Sheets

DISPLAY DEVICE COMPRISING A LIGHT-GUIDE FILM HAVING A PLURALITY OF WAVEGUIDE PARTS THAT HAVE A REFRACTIVE INDEX

RELATED APPLICATIONS

The present application claims the benefit of Chinese Patent Application No. 201410273166.0, filed Jun. 18, 2014, the entire disclosure of which is incorporated herein by reference.

FIELD

The present disclosure relates to the field of display technology, and particularly to a display device.

BACKGROUND

Currently, a liquid crystal display has been widely and popularly applied in TV and computer monitors. In operation, the liquid crystal display requires a backlight unit to provide light. The existing backlight unit needs a substrate and a light-guide member on the substrate, which imposes limits on the thin design of the display device.

SUMMARY

The present disclosure provides a display device. The display device may avoid, or otherwise alleviate, one or more of the drawbacks of conventional display devices.

A display device comprises a display panel. The display device further comprises: a light-guide film attached to a light-incident surface of the display panel, wherein the light-guide film comprises a light reflecting layer, a light exiting layer between the light reflecting layer and the display panel, and a plurality of waveguide parts between the light reflecting layer and the light exiting layer, wherein the light exiting layer is provided with a plurality of exit openings at positions facing each waveguide part, and each exit opening faces a sub-pixel unit in the display panel; and a light source module, wherein an end of each waveguide part is communicated with the light source module.

In the above display device, the light-guide film is directly attached to the light-incident surface of the display panel. The attachment of the light-guide film to the display panel does not require metal members like a backplate in a conventional display device.

The light-guide film comprises a light reflecting layer, a light exiting layer, and a plurality of waveguide parts between the light reflecting layer and the light exiting layer. As noted above, the light exiting layer is provided with a plurality of exit openings at positions facing each waveguide part, and each exit opening faces a sub-pixel unit in the display panel. An end of each waveguide part is communicated with the light source module. In the light-guide film, the light from the light source can be input into each waveguide part via an end of the waveguide part and transmitted through the waveguide part. The light transmitted through each waveguide part can exit via each corresponding exit opening in the light exiting layer which faces a sub-pixel unit in the display panel, and finally is guided into the corresponding sub-pixel unit, thus providing a backlight source for the display panel. In this manner, it is not necessary to arrange any optical film member between the light-guide film and the display panel, thus allowing for a further decrease in the thickness of the display device.

In the display device of the present disclosure, the conventional backlight unit is replaced with the light-guide film as described above. By attaching the light-guide film to the display panel, it is possible to eliminate the backplate and related optical film members in the conventional backlight unit, thus realizing a thinner design.

The plurality of waveguide parts can be arranged in parallel. When the plurality of waveguide parts are arranged in parallel, the plurality of exit openings can be regularly arranged in the light exiting layer in an easy manner.

The material of the waveguide part can have a larger refractive index than that of the light reflecting layer and the light exiting layer. In this case, the transmission of light within the waveguide part is facilitated.

The light source module can comprise a light source and a beam splitter, and an end of each waveguide part is coupled with the light source through the beam splitter.

The light source can be a plurality of monochromatic light sources, and an end of each waveguide part is coupled with one of the monochromatic light sources with a certain color through the beam splitter. The monochromatic light enters each waveguide part via an end of the waveguide part, transmits through the waveguide part, exits through the corresponding exit opening in the light exiting layer which faces a corresponding sub-pixel unit in the display panel, and finally is guided into the sub-pixel unit. Therefore, the transmittance of the light is improved, and the utilization efficiency of the light is improved.

The plurality of monochromatic light sources can comprise a red light source, a green light source, and a blue light source.

The light source can be an optical fiber laser light source.

The material of the light exiting layer can have the same refractive index as the light reflecting layer.

The light exiting layer can be the same material as the light reflecting layer.

The light source module can be embedded in the light-guide film.

The display device can be a liquid crystal display device.

BRIEF DESCRIPTION OF THE DRAWINGS

Several technical aspects of the present disclosure will be described in more detail below with reference to the accompanying drawings in order for those skilled in the art to be able to carry out the present disclosure. The present disclosure may, however, be embodied in many different forms and should not be construed as limited to the exemplary embodiments set forth herein. In particular, the general inventive concepts are not intended to be limited by the various illustrative embodiments disclosed herein.

DETAILED DESCRIPTION

The present invention and associated general inventive concepts will be further described hereinafter in detail with reference to the accompanying drawings and various exemplary embodiments. One of ordinary skill in the art will appreciate that these exemplary embodiments only constitute a fraction of the possible embodiments encompassed by the present invention and associated general inventive concepts. As such, the scope of the present disclosure is by no means limited to the exemplary embodiments set forth herein.

Figure 1:
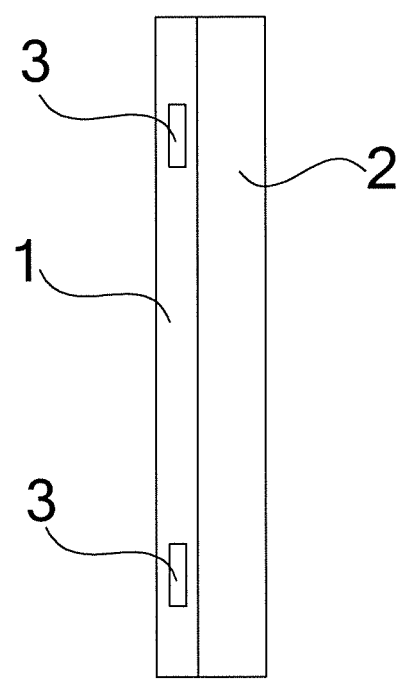
FIG. 1 is a cross-sectional view illustrating a display device, according to an exemplary embodiment.
Figure 2:
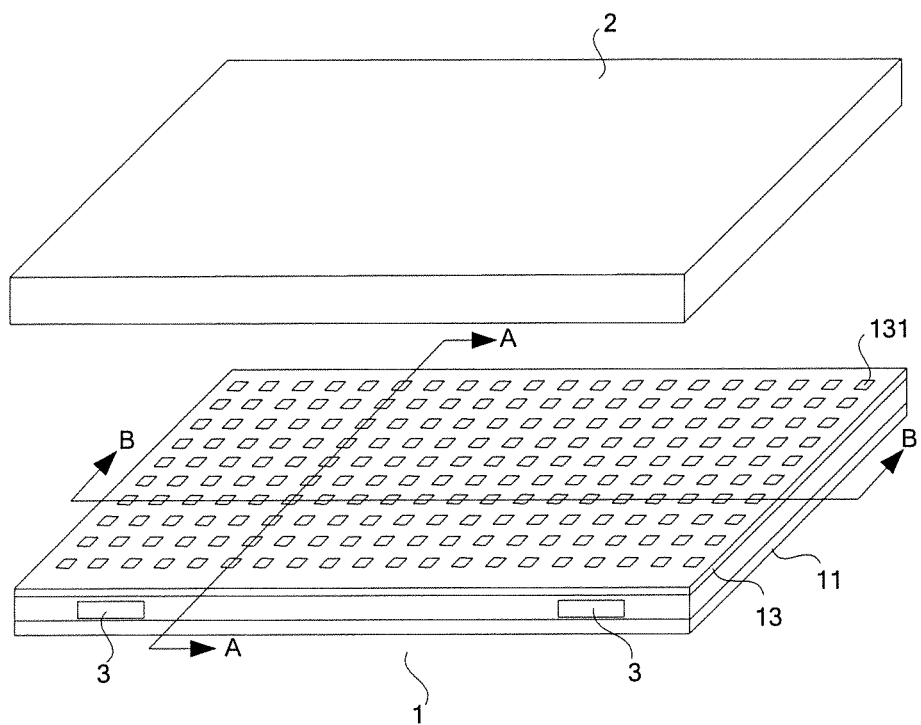
FIG. 2 is an exploded structural diagram illustrating a display device, according to an exemplary embodiment.
Figure 3:
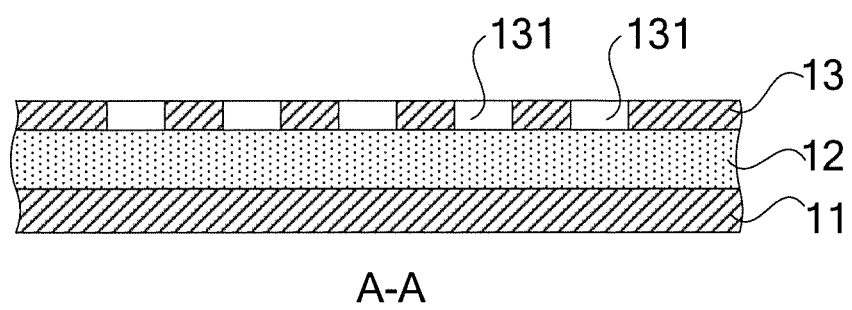
FIG. 3 is a partial cross-sectional view illustrating a light-guide film in the display device of FIG. 2 in the direction of line A-A.
Figure 4:
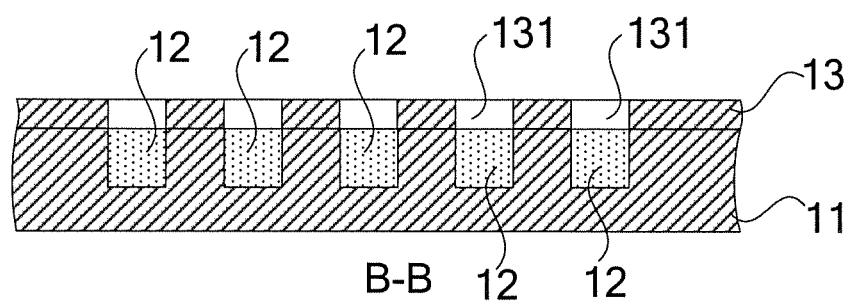
FIG. 4 is a partial cross-sectional view illustrating a light-guide film in the display device of FIG. 2 in the direction of line B-B.

Reference is made to FIGS. 1, 2, 3, and 4, wherein FIG. 1 is a cross-sectional view illustrating an exemplary display device of the present disclosure, FIG. 2 is an exploded structural diagram illustrating an exemplary display device of the present disclosure, FIG. 3 is a partial cross-sectional view illustrating a light-guide film in the display device of FIG. 2 along line A-A, and FIG. 4 is a partial cross-sectional view illustrating a light-guide film in the display device of FIG. 2 along line B-B.

As shown in FIGS. 1, 2, 3, and 4, the display device of the present disclosure, according to an exemplary embodiment, comprises a display panel 2. The display device further comprises a light-guide film 1 attached to a light-incident surface of the display panel 2. The light-guide film 1 comprises a light reflecting layer 11, a light exiting layer 13 between the light reflecting layer 11 and the display panel 2, and a plurality of waveguide parts 12 between the light reflecting layer 11 and the light exiting layer 13. The plurality of waveguide parts 12 are arranged in parallel. The material of the waveguide parts 12 can have a larger refractive index than that of the light reflecting layer 11 and the light exiting layer 13, thus facilitating transmission of light within the waveguide parts 12. The light exiting layer 13 is provided with a plurality of exit openings 131 at positions facing each waveguide part 12, and each exit opening 131 faces a sub-pixel unit in the display panel 2.

The display device further comprises a light source module 3. An end of each waveguide part 12 is communicated with the light source module 3.

In the above display device, the light-guide film 1 is directly attached to the light-incident surface of the display panel 2. The attachment of the light-guide film 1 to the display panel 2 does not require metal members or similar structures used for a backplate in a conventional display device.

The light-guide film 1 comprises the light reflecting layer 11, the light exiting layer 13, and the plurality of waveguide parts 12 between the light reflecting layer 11 and the light exiting layer 13. The light exiting layer 13 is provided with a plurality of exit openings 131 at positions facing each waveguide part 12, and each exit opening 131 also faces a sub-pixel unit in the display panel 2. An end of each waveguide part 12 is communicated with the light source module 3. In the light-guide film 1, the light from the light source can be input into each waveguide part 12 via an end of the waveguide part 12 and transmitted through the waveguide part 12. The light transmitted through each waveguide part 12 can exit via each corresponding exit opening 131 in the light exiting layer 13 which faces a sub-pixel unit in the display panel 2, and finally is guided into the corresponding sub-pixel unit, thus providing a backlight source for the display panel 2. Since it is not necessary to arrange any optical film member between the light-guide film 1 and the display panel 2, the thickness of the display device can be further decreased.

The display device of the present disclosure replaces the conventional backlight unit with the light-guide film 1. By attaching the light-guide film 1 to the display panel 2, it is possible to eliminate the backplate and related optical film members used in the conventional backlight unit, thus realizing a thinner design.

As an example, the light source module 3 can comprise a light source and a beam splitter (not shown). An end of each waveguide part 12 is coupled with the light source through the beam splitter.

In an exemplary embodiment, the light source comprises a plurality of monochromatic light sources. Specifically, the plurality of monochromatic light sources can comprise a red light source, a green light source, and a blue light source. As shown in FIGS. 2 and 3, each monochromatic light source is communicated with an end of one of the waveguide parts 12 through the beam splitter. The light is then transmitted within the waveguide parts 12, exits through each corresponding exit opening 131 in the light exiting layer 13 which faces a sub-pixel units in the display panel 2, and finally is guided into the corresponding sub-pixel unit. Thus, the transmittance of the light is improved, and the utilization efficiency of the light is improved.

In an exemplary embodiment, the light source is an optical fiber laser light source.

In an exemplary embodiment, the material of the light exiting layer 13 has the same refractive index as the material of the light reflecting layer 11.

In an exemplary, the material of the light exiting layer 13 is the same material as the material of the light reflecting layer 11.

In an exemplary embodiment, the light source module 3 can be embedded in the light-guide film 1.

In an exemplary embodiment the display device is a liquid crystal display device. The display device can be applied to any product or component with a display function, for example, a mobile phone, a tablet computer, a TV, a monitor, a notebook computer, a digital photo frame, a GPS navigator, and the like.

Although the present disclosure has been described with reference to specific embodiments, it should be understood that the limitations of the described embodiments are provided merely for purpose of illustration and are not intended to limit the present invention and associated general inventive concepts. Instead, the scope of the present invention is defined by the appended claims, and all variations and equivalents that fall within the range of the claims are intended to be embraced therein. Thus, other embodiments than the specific exemplary ones described herein are equally possible within the scope of these appended claims.

The invention claimed is:

1. A display device comprising:
   a display panel;
   a light-guide film attached to a light-incident surface of the display panel, wherein the light-guide film comprises a light reflecting layer, a light exiting layer between the light reflecting layer and the display panel, and a plurality of waveguide parts between the light reflecting layer and the light exiting layer, wherein the light exiting layer is provided with a plurality of exit openings at positions facing each waveguide part, and wherein each exit opening faces a sub-pixel unit in the display panel; and
   a light source module, wherein an end of each waveguide part is communicated with the light source module,
   wherein the waveguide parts have a larger refractive index than the light reflecting layer and the light exiting layer.

2. The display device of claim 1, wherein the plurality of waveguide parts are arranged in parallel.

3. The display device of claim 1, wherein the light source module comprises a light source and a beam splitter, and
wherein an end of each waveguide part is coupled with the light source through the beam splitter.

4. The display device of claim 3, wherein the light source is a plurality of monochromatic light sources, and
wherein an end of each waveguide part is coupled with one of the monochromatic light sources having a certain color through the beam splitter.

5. The display device of claim 4, wherein the plurality of monochromatic light sources comprise a red light source, a green light source, and a blue light source.

6. The display device of claim 4, wherein the light source is an optical fiber laser light source.

7. The display device of claim 1, wherein the material of the light exiting layer has the same refractive index as that of the light reflecting layer.

8. The display device of claim 7, wherein the light exiting layer is formed of the same material as the light reflecting layer.

9. The display device of claim 1, wherein the light source module is embedded in the light-guide film.

10. The display device of claim 1, wherein the display device is a liquid crystal display device.

* * * * *